United States Patent [19]

Hoover et al.

[11] Patent Number: 4,611,151
[45] Date of Patent: Sep. 9, 1986

[54] DEFLECTION RATE PARABOLIC WAVEFORM GENERATING CIRCUIT

[75] Inventors: Alan A. Hoover, New Palestine; David W. Luz; Jeffery B. Lendaro, both of Indianapolis, all of Ind.

[73] Assignee: RCA Corporation, Princeton, N.J.

[21] Appl. No.: 714,579

[22] Filed: Mar. 21, 1985

[51] Int. Cl.$^4$ .................. H01J 29/70; H01J 29/76
[52] U.S. Cl. ............................................. 315/368
[58] Field of Search .................. 315/368, 371, 382; 358/60

[56] References Cited

U.S. PATENT DOCUMENTS 4,352,124  9/1982  Kline ....................................... 358/60
4,472,662  9/1984  Freed ..................................... 315/399

OTHER PUBLICATIONS

A data sheet for Dynamic Focusing Transformer No. AT4043/67 published by Philips Corporation dated Apr. 1980.
A schematic entitled Schematics Deflection Board, cover page and pp. 12–14 of the accompanying text that are included in the operating manual VR–Series of Moniterm Corporation.
A service manual for CTC 132 Series made by RCA Corporation, entitled Projection Television Basic Service Data, dated 1984, cover page and pp. 44–46 and 54–57 enclosed.
An article entitled Projection Television: Correcting Distortions by Konrad Schiecke and published in IEEE Spectrum, dated Nov. 1981, pp. 40–45.

Primary Examiner—Theodore M. Blum
Attorney, Agent, or Firm—Eugene M. Whitacre; Joseph J. Laks; Sammy S. Henig

[57] ABSTRACT

A television apparatus, for generating a deflection rate parabolic auxiliary deflection current that corrects convergence distortions, includes a deflection generator output stage coupled to a deflection winding. The deflection generator output stage generates a trace scanning current during a trace interval. The primary winding of a transformer is coupled in a current path of the trace current. A parabolic voltage developing capacitance is coupled across a first secondary winding of the transformer. The trace scanning current in the primary winding of the transformer causes a deflection rate parabolic voltage to develop across a second secondary winding of the transformer. The parabolic voltage across a second secondary winding of the transformer is used for generating the convergence distortion correction current.

8 Claims, 3 Drawing Figures

DEFLECTION RATE PARABOLIC WAVEFORM GENERATING CIRCUIT

The present invention relates to a parabolic voltage generating circuit that modulates the voltage supplied to a distortion correction winding of a cathode ray tube (CRT).

Figure 1:
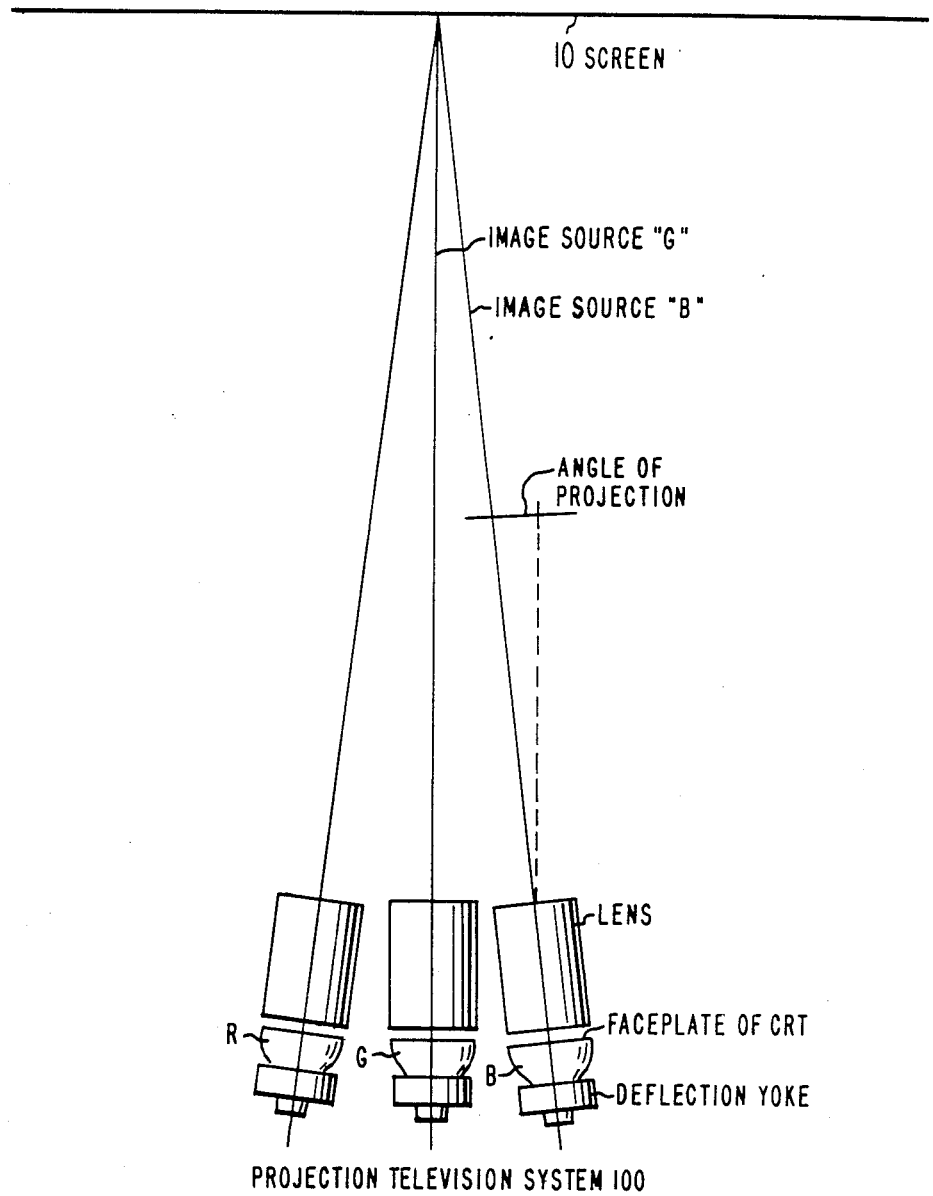

In a projection television system, the image generated on the faceplate of the picture tube is magnified through a lens and projected on to a screen. In a color projection television system, there are three picture tubes which separately display red, green and blue information of a color television picture. These three picture tubes may be arranged in a triad or side by side on a horizontal axis. In the system for which the correction circuits according to the subject invention are designed, the three picture tubes are arranged, illustratively, side by side on a horizontal axis as shown in FIG. 1.

In color projection television, the images of all three picture tubes must be superimposed so that a single image appears on the screen. Each image must be exactly the same size and shape so that the superpositions can be accomplished. In the system shown schematically in FIG. 1, the center picture tube is projected perpendicular to the screen while the two outer tubes are projected at an angle such that superposition is possible.

The image that originates from either the right or left CRT may suffer from so called linearity distortion because of different or varying angles by which the light beam of the image lands on the screen. This causes a progressive compression of the image from one side of the screen to the other. Linearity distortion can be corrected by superimposing a horizontal parabolic waveform into a horizontal deflection convergence correction winding.

Bow distortion, in a projection television system, occurs because the optical projection screen is spherically curved. For this reason, the center of both the upper and lower parts of the picture have to be lowered and the left and right edges of the picture have to be raised. Bow distortion can be similarly corrected by superimposing a horizontal parabolic waveform into a vertical deflection convergence correction winding.

In a prior art projection television system, a parabolically shaped signal, repeating at the horizontal scan rate, is produced across a capacitor coupled in series with the deflection winding for providing the dual function of DC blocking and S-shaping. In general, however, the parabolically shaped voltage across the S-shaping capacitor is not suitable for direct application to either the horizontal or vertical deflection convergence winding. For example, its amplitude may be too large and its polarity may be opposite to that generally required. Some conventional projection television convergence correction circuits use a transformer to couple the voltage across the S-shaping capacitor. However, as has been mentioned, the S-shaping capacitor also serves to block the DC operating voltage which is required for the deflection circuit. In order to prevent this relatively high DC voltage from being applied across the transformer primary winding, a blocking capacitor may be required. Such a capacitor is required to have a sufficiently large value to couple the parabolically shaped voltage and it also has to withstand the DC voltage component across the S-shaping capacitor. Furthermore, in order to reduce the loading of the S-shaping capacitor by the transformer primary winding, the number of turns in the primary winding has to be relatively high. Such transformer with large number of turns is, disadvantageously, expensive.

In carrying out an aspect of the invention, a main deflection winding of a CRT is coupled to a deflection circuit output stage that generates a deflection current in the main deflection winding. A first transformer winding is coupled to conduct the deflection current that flows through the main deflection winding. During a first portion of each trace interval, the trace deflection current flows in the first transformer winding in one direction and during a second portion of each trace interval it flows in the opposite direction. A parabolic voltage developing capacitance is coupled to a second winding of the transformer. The capacitance of the parabolic voltage developing capacitance is reflected between the end terminals of the first transformer winding to provide a reflected capacitive impedance. The deflection current that flows in the first transformer winding develops a first parabolic voltage across the reflected capacitive impedance. The first parabolic voltage is used for generating a deflection rate parabolic convergence current component in an auxiliary deflection winding of the CRT.

In typical television display picture tubes, electron beam defocusing tends to occur near the screen edges. It is desirable to maintain sharp focus near the screen edges. To provide sharper focusing of the electron beam landing near the screen edges, focus voltage modulating circuits are employed to vary the picture tube focus voltage from a substantially DC voltage to one which includes parabolically shaped components repeating at the line and field scanning rates, respectively.

In accordance with another aspect of the invention, the first, or primary, winding of the transformer that is used for generating the convergence current is coupled in series with the main deflection winding. The parabolically shaped deflection rate output voltage appears across the secondary winding of the transformer, that is a step-up transformer, where it is combined with a further voltage to provide a focus voltage that is modulated. Such arrangement, embodying an aspect of the invention, in which both the modulated deflection convergence current generating circuit and the focus voltage generating circuit are coupled to the common step-up transformer may also be employed in a conventional three beam single CRT where the convergence distortion is caused by the electron-optics of the deflection field.

In accordance with still another aspect of the invention, the step-up transformer primary winding is coupled in series with an S-shaping capacitor. Therefore, it does not load the S-shaping capacitor as is the case in some circuits of the prior art. Because the loading of the S-shaping capacitor does not occur, the number of turns of the primary winding may be small. In contrast, in some prior art circuits the number of turns is large for avoiding the loading of the S-shaping capacitor. Because the primary winding is series coupled with the S-shaping capacitor, additional DC blocking capacitor that is used in some circuit of the prior art need not be used in the circuit of the invention.

Figure 2:
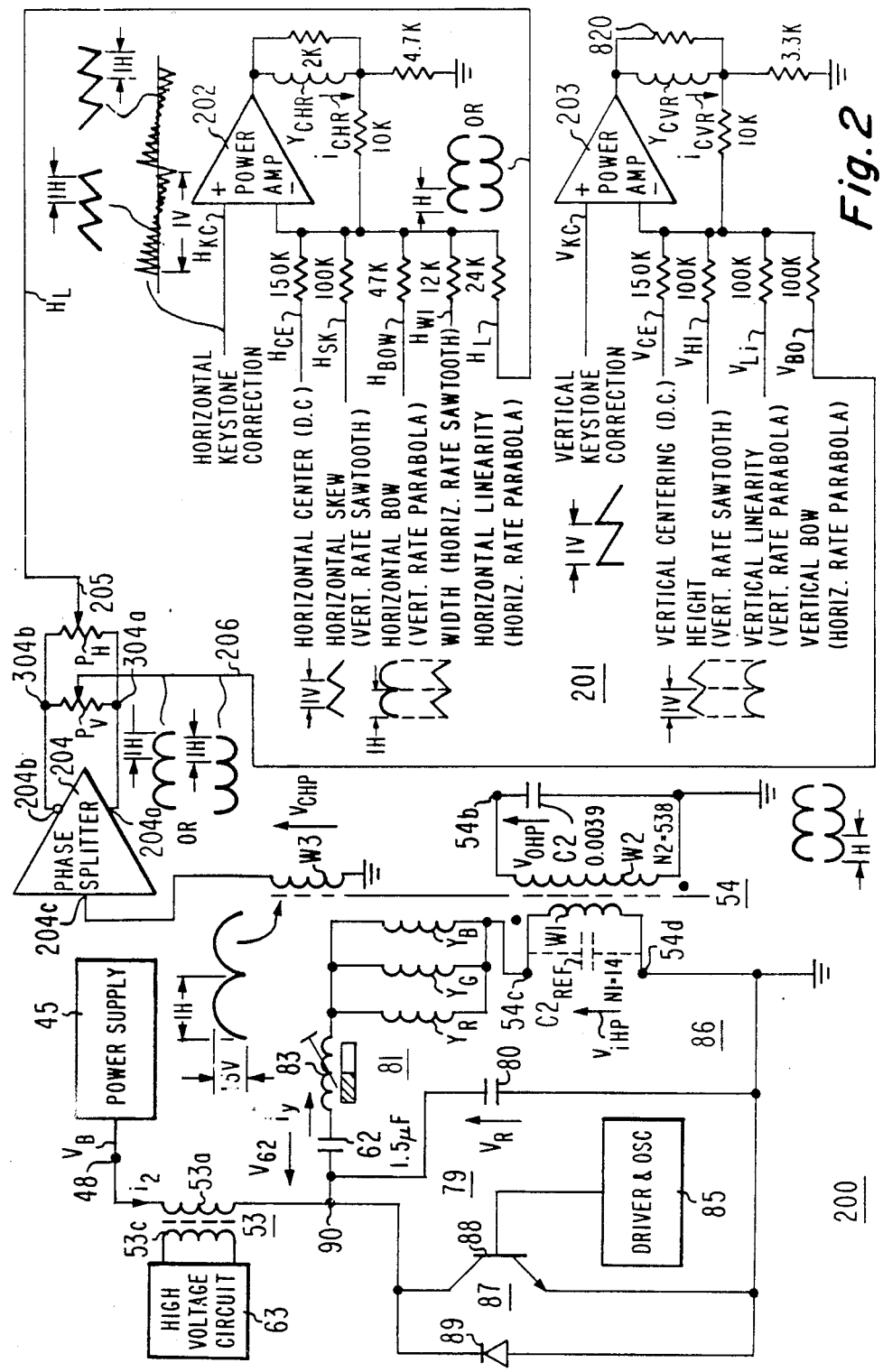
Figure 3:
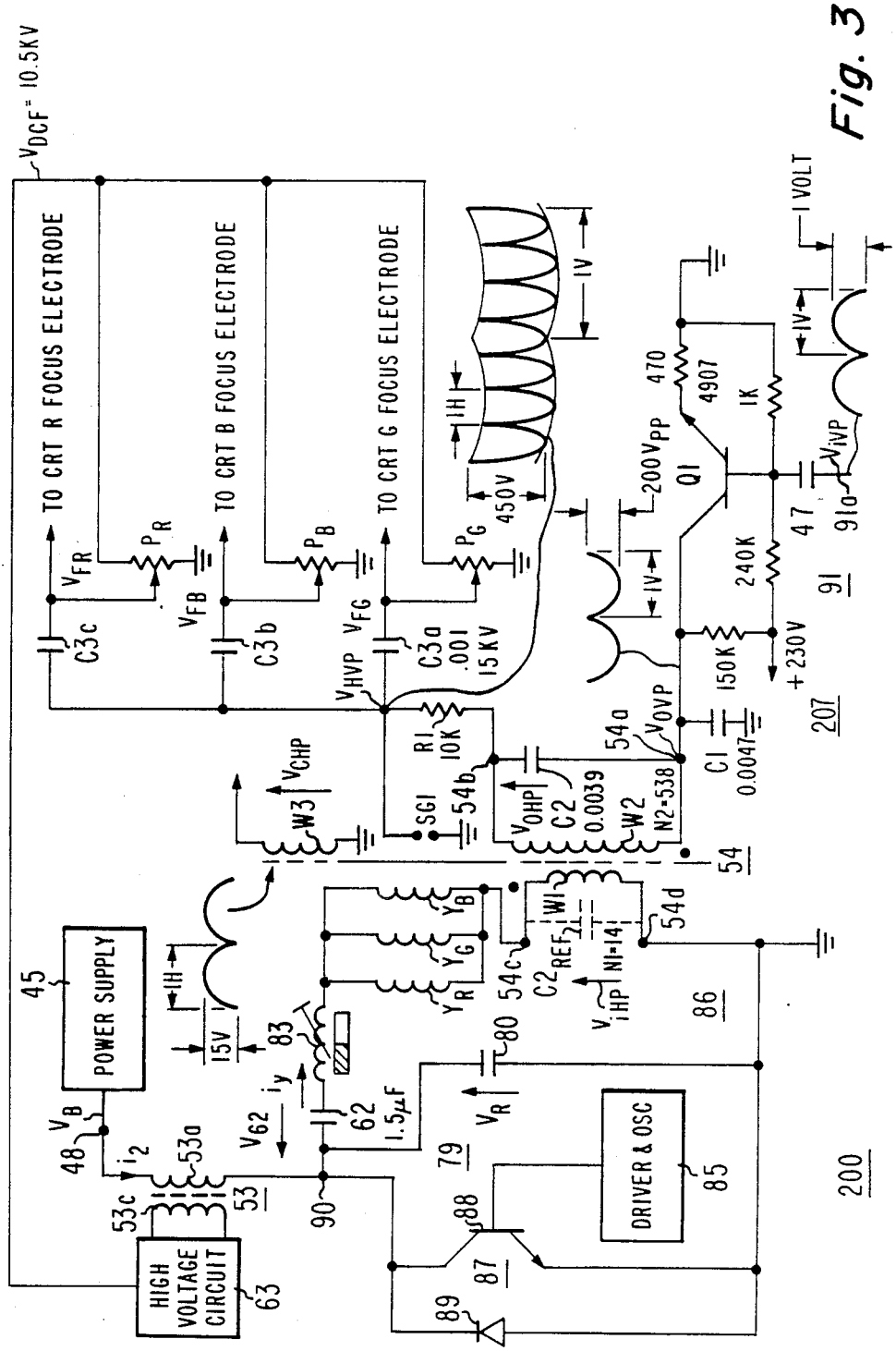

FIG. 1 schematically illustrates an in-line arrangement of CRTs R, G and B of a projection television system with the mirrors being omitted from the FIGURE;

FIG. 2 illustrates a convergence distortion correction circuit, embodying an aspect of the invention, that is coupled to a deflection rate parabolic voltage generating circuit; and FIG. 3 illustrates a dynamic focus waveform generating circuit in a projection television system embodying an aspect of the invention, that is coupled to the deflection rate parabolic voltage generating circuit of FIG. 2.

In a parabolic voltage generating circuit 200, illustrated in FIG. 2, a filtered DC voltage $V_B$ is developed at a terminal 48 by a power supply 45. Terminal 48 is coupled through primary winding 53a of a horizontal output flyback transformer 53 to a terminal 90 of a horizontal deflection generator 86.

A horizontal deflection winding arrangement 81 that includes parallel coupled deflection windings $Y_R$, $Y_G$ and $Y_B$, is coupled to horizontal deflection generator 86. Deflection windings $Y_R$, $Y_G$ and $Y_B$ provide horizontal deflection in CRT's R, G and B, respectively, of a projection television system 100 of FIG. 1. Generator 86 of FIG. 2 comprises a series arrangement of a linearity inductor 83, an S-shaping, or trace, capacitor 62 and a circuit 79 that includes a retrace capacitor 80 coupled in parallel to a trace switch 87. Trace switch 87 comprises a horizontal output transistor 88 coupled in parallel with a damper diode 89. A conventional synchronized horizontal oscillator and driver circuit 85 provides switching control signals to the control base electrode of horizontal output transistor 88 to turn on the transistor during the horizontal trace interval and to turn off the transistor for initiating the horizontal retrace interval. Operation of switch 87 generates scanning current $i_y$ in deflection winding arrangement 81, in each horizontal deflection cycle. A high voltage winding 53c of flyback transformer 53 is coupled to a conventional high voltage circuit 63 for developing high voltages such as described later on.

A primary winding W1 of a step-up transformer 54 is coupled in series with deflection winding arrangement 81 and with S-shaping capacitor 62 to conduct deflection current $i_y$. Deflection current $i_y$ is the sum of the currents through deflection windings $Y_R$, $Y_G$ and $Y_B$. A horizontal parabolic voltage developing capacitor C2 is coupled across a secondary winding W2 of step-up transformer 54 between terminals 54a and 54b. As described later on, a horizontal rate parabolic voltage $V_{iHP}$ is developed across primary winding W1 by deflection current $i_y$ during trace. Likewise, a horizontal rate parabolic voltage $V_{OHP}$ is developed between terminals 54a and 54b by a transformer action.

In operation, deflection switch 87 is closed during the trace interval. When deflection switch 87 is closed, it isolates transformer 53 from deflection winding arrangement 81. An upramping primary current $i_2$ in primary winding 53a increases the energy stored in flyback transformer 53 during the trace interval. This stored energy replenishes losses in deflection circuit 86 during the retrace interval, when switch 87 is opened. Deflection generator 86 forms with transformer 53 a retrace resonant circuit. The energy stored in transformer 53 and deflection winding arrangement 81 at the end of the trace interval, is transferred into retrace capacitor 80 to produce a retrace voltage $V_R$ across retrace capacitor 80, during the retrace interval. The retrace voltage $V_R$ is applied to primary winding 53a of flyback transformer 53.

During the first half of the trace interval, deflection current $i_y$ causes voltage $V_{62}$ across S-shaping capacitor 62 to increase, so as to form one branch of a parabola waveform of voltage $V_{62}$ developed during the horizontal trace interval. During the second half of the trace interval, deflection current $i_y$ flows in a direction opposite to the way it flowed during the first half of the trace interval, causing voltage $V_{62}$ across capacitor 62 to decrease, so as to form the other branch of the parabola waveform of voltage $V_{62}$. The result is that voltage $V_{62}$ has a parabolic shape waveform during the trace interval.

Because of transformer action of step-up transformer 54, capacitor C2 appears, or is reflected, across terminals 54c and d of primary winding W1 as a large capacitive impedance $C2_{REF}$ that is illustrated in broken lines. The value of capacitive impedance $C2_{REF}$ is directly related to the capacitance of capacitor C2 and to the square of the turns ratio N2/N1 of windings W2 and W1, respectively. Reflected capacitive impedance $C2_{REF}$ that appears in series with S-shaping capacitor 62 causes voltage $V_{iHP}$, that is developed across end terminals 54c and 54d of primary winding W1, to be a horizontal rate, parabolic shape waveform. This waveform is developed in a manner similar to the way parabolic voltage $V_{62}$ across S-shaping capacitor 62 is developed. The high turns ratio N2/N1 steps this voltage up to obtain, the rather large, parabolic voltage $V_{OHP}$ between terminals 54a and b of secondary winding W2.

In FIG. 2 a convergence distortion correction circuit 201 includes a horizontal convergence winding $Y_{CHR}$ of the red CRT R is driven by a power amplifier 202. Similarly, a vertical convergence winding $Y_{CVR}$ is driven by a power amplifier 203. A circuit similar to circuit 201 of FIG. 2, but not shown in the figures, may be used for driving a horizontal convergence winding and a vertical convergence winding of the blue CRT B of projection television system 100 of FIG. 1.

Power amplifier 202 of FIG. 2 combines a horizontal keystone voltage $H_{KC}$, a horizontal centering voltage $H_{CE}$, a horizontal skew voltage $H_{SK}$, a horizontal bow voltage $H_{BOW}$ and a horizontal width voltage $H_{Wi}$, each obtained in a conventional manner. Furthermore, a horizontal linearity voltage $H_L$, that is obtained in accordance with an aspect of the invention is also combined in amplifier 202. Thus amplifier 202 generates a distortion correction current $i_{CHR}$ in winding $Y_{CHR}$. Similarly, power amplifier 203 combines a vertical keystone voltage $V_{KC}$, a vertical centering voltage $V_{CE}$, a height voltage $H_{Hi}$ and a vertical linearity voltage $V_{Li}$, that are each obtained in a conventional manner. Furthermore, a vertical bow voltage $V_{BO}$, that is obtained in accordance with an aspect of the invention, is also combined in amplifier 203. Thus amplifier 203 generates a distortion correction current $i_{CVR}$ in winding $Y_{CVR}$.

In accordance with an aspect of the invention, a secondary winding W3 of transformer 54 provides by transformer action a horizontal rate parabolic voltage $V_{CHP}$. Voltage $V_{CHP}$ is coupled to an input terminal 204c of a phase splitter 204 of FIG. 2. Phase splitter 204 generates, from voltage $V_{CHP}$, parabolic voltages 304a and 304b that are of opposite phase, or polarity, at terminals 204a and 204b, respectively, of phase splitter 204. Voltages 304b and 304a are coupled across each of resistors $P_V$ and $P_H$. A wiper arm 205 of resistor $P_H$ is coupled to an input terminal of power amplifier 202 to provide horizontal linearity voltage $H_L$. Similarly, a wiper arm 206 of resistor $P_V$ is coupled to an input terminal of power amplifier 203 to provide vertical bow voltage $V_{BO}$.

Voltage $V_{BO}$ that is parabolic at the horizontal frequency $f_H$ causes amplifier 203 to generate a horizontal rate parabolic component in current $i_{CVR}$ of winding $Y_{CVR}$. As mentioned before, such horizontal rate parabolic component of current $i_{CVR}$ corrects bow distortions in CRT R. Note that the position of wiper arm 206, for example, determines the phase, as well as the amplitude, of voltage $V_{BO}$.

Linearity voltage $H_L$ that is parabolic at the frequency $f_H$ causes amplifier 202 to include a parabolic component in current $i_{CHR}$ of winding $Y_{CHR}$. The parabolic component corrects geometric distortions introduced by optically projecting off-axis images onto the screen, as mentioned before.

FIG. 3 illustrates a dynamic focus voltage generating circuit 202 coupled to the parabolic voltage generating circuit 200 of FIG. 2. Similar numbers and symbols in FIGS. 1, 2 and 3 indicate similar items or functions.

Referring to FIG. 3, a vertical parabolic voltage $V_{iVP}$ is coupled from, for example, an S-shaping capacitor of a vertical deflection circuit, that is not shown in the figures. Voltage $V_{iVP}$ is applied to an input terminal 91a of an amplifier 91.

The parabolic output voltage $V_{OVP}$ of amplifier 91, repeating at the vertical deflection frequency $f_v$, is developed between terminal 54a of step-up transformer 54 and ground. Amplifier 91 is a conventional inverter amplifier operating in class A. A capacitor C1 that is coupled to terminal 54a provides alternating current (AC) ground for any horizontal rate voltage that may appear there.

A voltage $V_{HVP}$ that is substantially the sum of voltages $V_{OVP}$ and $V_{OHP}$ is coupled through capacitors C3c, C3b and C3a, respectively, to the focus electrodes of CRT's R, G and B, respectively, of projection television system 100 of FIG. 1, to form dynamic or modulated focus voltages $V_{FR}$, $V_{FB}$ and $V_{FG}$, respectively, of FIG. 3. Each of voltages $V_{FR}$, $V_{FB}$ and $V_{FG}$, includes a corresponding DC voltage component that is coupled from a corresponding wiper arm of resistors $P_R$, $P_B$ and $P_G$, respectively.

An intermediate, substantially direct current (DC), high voltage $V_{DCF}$ generated by high voltage circuit 63 provides the DC component voltage of each of focus voltages $V_{FR}$, $V_{FB}$ and $V_{FG}$ of CRT's R, B and G, respectively, of FIG. 1. Retrace voltage $V_R$ of FIG. 3 is used, in high voltage circuit 63, to produce, in a conventional manner, intermediate DC high voltage $V_{DCF}$.

The DC component voltage that is included in, for example, voltage $V_{FR}$ is variable, in accordance with the relative position of the wiper arm of resistor $P_R$. The AC component voltage that is controlled by voltage $V_{HVP}$ at terminal 60, provides dynamic variations of focus voltage $V_{FR}$.

Step-up transformer 54 has no degrading effects on the rest of the horizontal deflection circuit as long as the resistance of primary winding W1 is kept low. S-shaping capacitor 62 can be made slightly larger than the particularly required value for S-shaping, so that the combined value of reflected capacitive impedance $C2_{REF}$ in series with the slightly larger S-shaping capacitor 62 becomes equal to the particularly required value for S-shaping.

Winding W3 of transformer 54 of FIG. 3 provides parabolic voltage $V_{CHP}$. As described before, parabolic voltage $V_{CHP}$ is used for generating convergence correction currents $i_{CVR}$ and $i_{CHR}$ in circuit 201 of FIG. 2. Thus, step-up transformer 54 provides, in an advantageously economic manner, the dual functions of providing parabolic voltage $V_{OHP}$ for circuit 202 of FIG. 3, and parabolic voltage $V_{CHP}$ for circuit 201 of FIG. 2.

What is claimed is:

1. An apparatus for generating a deflection rate parabolic convergence current component in an auxiliary deflection winding of a cathode ray tube and a dynamic focus voltage that is coupled to said cathode ray tube, comprising:

a main deflection winding;

a deflection generator coupled to said main deflection winding for generating a trace scanning current therein during a trace interval;

a transformer having first, second and third windings, said third winding being coupled in a current path of said deflection winding such that said trace scanning current through said main deflection winding flows between first and second terminals of said third winding;

a parabolic voltage developing capacitance coupled to said second winding, said parabolic voltage developing capacitance being reflected as a capacitive impedance between said first and second terminals of said third winding, wherein said trace scanning current in said third winding of said transformer causes a deflection rate, parabolic voltage to be developed across said reflected capacitive impedance for developing a deflection rate, parabolic, first voltage in said first winding of said transformer;

convergence means coupled to said auxiliary deflection winding and to said first winding and responsive to said first voltage for generating a deflection rate parabolic current component in said auxiliary deflection winding; and a source of an AC, second voltage coupled to said second winding in such a way that said transformer prevents said second voltage from substantially affecting said first voltage in said first winding, said second voltage producing at a terminal of said second winding said dynamic focus voltage that is determined in accordance with the voltage across said second winding that is parabolic and in accordance with said second voltage.

2. The apparatus as recited in claim 1, including a second auxiliary deflection winding associated with a second cathode ray tube of a three tube projection television system and second convergence means coupled to said second auxiliary deflection winding for generating a deflection rate parabolic current component in said second auxiliary deflection winding for correcting convergence distortion in said projection television system.

3. The apparatus as recited in claim 2 wherein said convergence distortion is a linearity distortion in said projection television system.

4. The apparatus as recited in claim 2 wherein said convergence distortion is a bow distortion in said projection television system.

5. The apparatus as recited in claim 4 wherein said main deflection winding provides horizontal deflection in said cathode ray tube.

6. The apparatus as recited in claim 5 including means responsive to a signal at a second deflection rate for developing said second voltage that is combined in series with the parabolic voltage across said second winding to provide a dynamic focus voltage.

7. The apparatus as recited in claim 5 wherein said source of said second voltage is responsive to a vertical rate signal for developing said second voltage as a vertical rate parabolic voltage.

8. The apparatus as recited in claim 7 further comprising, means for selectively controlling the polarity of a third parabolic voltage that is determined in accordance with said first voltage to provide the corresponding polarity of said deflection rate parabolic current component that is used for correcting raster distortion.

* * * * *

UNITED STATES PATENT AND TRADEMARK OFFICE
CERTIFICATE OF CORRECTION

PATENT NO. : 4,611,151

DATED : September 9, 1986

INVENTOR(S) : ALAN A. HOOVER

It is certified that error appears in the above-identified patent and that said Letters Patent is hereby corrected as shown below:

Column 6, line 61(first line of Claim 5), "4" should read --1--

Column 6, line 64(first line of Claim 6), "5" should read --1--

Column 7, line 1 (first line of Claim 7), "5" should read --1--

Column 7, line 5 (first line of Claim 8), "7" should read --1--

Signed and Sealed this

Thirtieth Day of August, 1988

Attest:

DONALD J. QUIGG

*Attesting Officer*          *Commissioner of Patents and Trademarks*